United States Patent Office 3,209,939
Patented Oct. 5, 1965

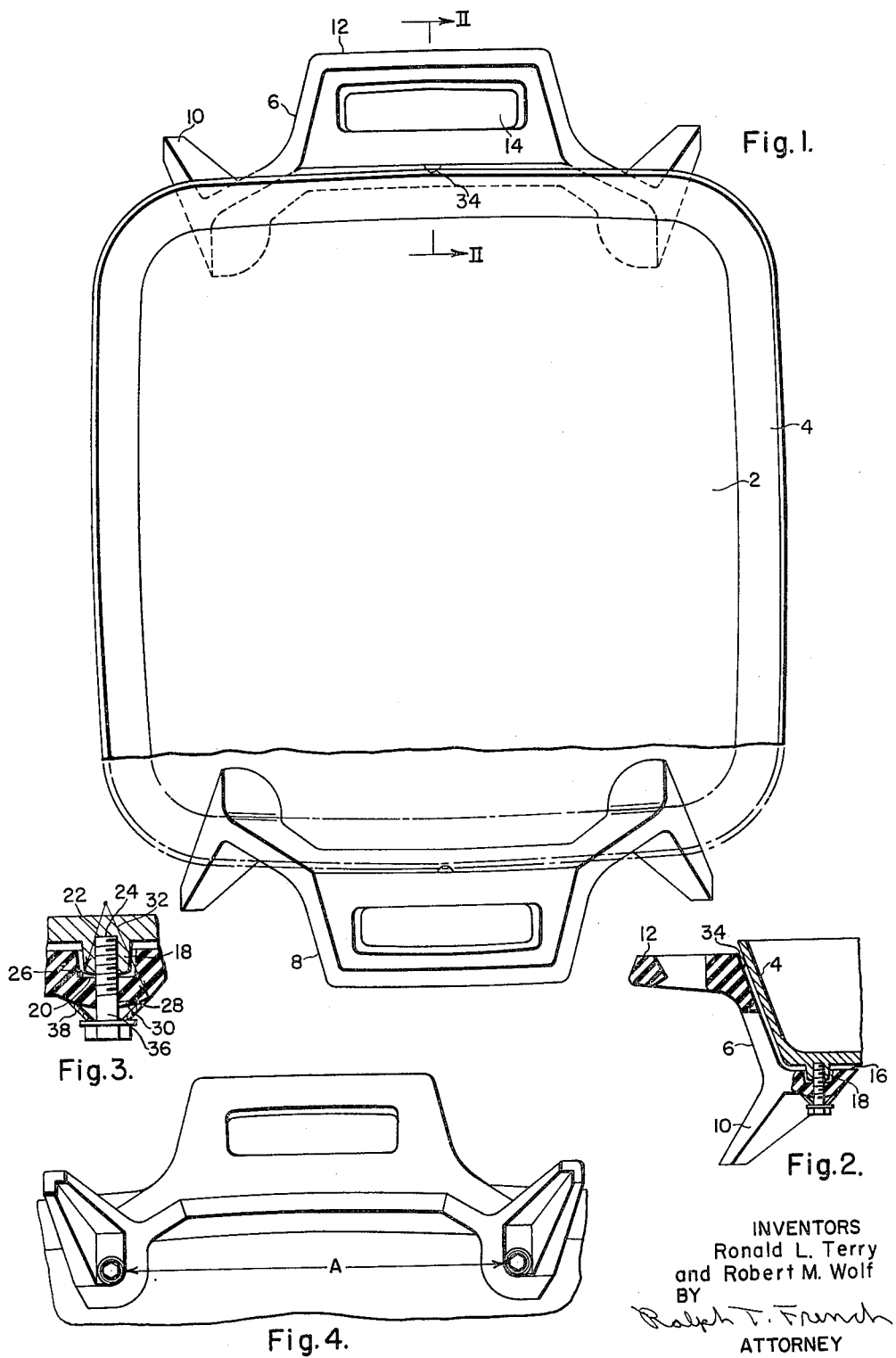

3,209,939
HANDLE-LEG COMBINATION FOR COOKING UTENSIL
Ronald L. Terry, Shelby, Ohio, and Robert M. Wolf, Wheaton, Ill., assignors to Westinghouse Electric Corporation, East Pittsburgh, Pa., a corporation of Pennsylvania
Filed May 3, 1963, Ser. No. 277,944
10 Claims. (Cl. 220—94)

The present invention relates in general to cooking utensils, and more particularly to cooking utensils having an improved combination handle and leg.

There are a great number of cooking utensils of the electric fry-pan variety on the market. All of these cooking utensils require insulating legs to isolate the high temperature of the cooking surface from the table or support surface used for the utensil. Also a temperature insulating handle is required so that the utensil may readily be moved by the user while the utensil is in operation. As is evidenced by the many replacement handles and legs required for household utensils, there are many problems involved in providing a good connection of the handle or leg to the body of the utensil. The direct bolting or screwing of the handle or leg to the main body of the utensil gives rise to the inherent stress of a three point tie down of the part to the cooking member. Moreover, the need for fixtures to attach the handle or leg to the utensil often creates difficulties in the assembly of the utensil. This often requires very close tolerances to be maintained and that additional steps be included in the assembly operation. Thus, there is an overall increase in the cost of the completed cooking utensil.

It is, therefore, an object of the present invention to facilitate attachment of a leg-handle combination to a cooking utensil.

It is a further object of the present invention to reduce stresses in the attachment of a leg and handle combination to a cooking utensil.

Broadly, the above-cited objects are accomplished by providing a cooking utensil having combination leg-handle members which respectfully fit over a portion of the bottom and side walls of the cooking utensil. The leg-handle is attached to the cooking utensil so that no torque is applied to the leg-handle, and thus, there is no resulting stress on the leg-handle combination.

These and other objects and advantages of the present invention will become more apparent when considered in view of the following specification and drawings, in which:

FIGURE 1 is a top view of a cooking utensil of the present invention;

FIG. 2 is a sectional view showing the attachment of the leg-handle to the cooking utensil;

FIG. 3 is an enlarged fragmentary sectional view showing in detail the attachment of the leg-handle to the cooking utensil; and FIG. 4 is a bottom view of the leg-handle.

Referring now to FIGURE 1, a fry-pan which may be of the electrical variety, is shown having a substantially planar bottom wall 2. Extending upwardly and outwardly from the bottom wall 2 are side walls 4. The bottom and side walls are formed in one piece and the utensil is frequently cast from a material such as aluminum. The leg-handle members 6 and 8 are placed at opposite sides of the substantially rectangular utensil. The leg-handle members are unitary in construction and are formed from a heat-insulating material molded in the shape as shown. Each of the leg-handles has a leg portion 10 and a handle portion 12. The leg portion 10 extends downwardly to provide support to the cooking utensil, while the handle portion 12 extends laterally so that the utensil may be readily gripped. A substantially rectangular slot 14 is formed in the handle portion 12 to aid in gripping and to space the gripped portion from the utensil.

FIG. 2 shows in greater detail the attachment of the leg-handle member 6 to the cooking utensil. The leg-handle 6 has an inner surface 16 which conforms to that of the cooking utensil with the inner surface 16 adjacent the leg portion 10 conforming to the shape of the bottom wall of the cooking utensil. The inner surface extends around from the bottom wall along the side wall of the utensil to adjacent the handle portion 12.

There are four bosses molded onto the bottom wall of the cooking utensil which serve as mounting receptacles for the leg-handle members. One of these bosses 18 is shown in FIG. 2 and in more detail in FIG. 3. Each of the bosses extends downwardly from the bottom wall 2 and has a cylindrical side surface. The bottom surface 20 of each of the bosses has a predetermined spherical radius 22, see FIG. 3. A hole 24 is provided in each of the bosses extending from the bottom surface 20 upwardly into the boss.

A flat-bottom counter-sunk hole or recess 26 is provided in each leg portion 10 of the leg-handle members. There will be two such recesses in each of the leg-handle members for receiving and mating with a pair of the bosses 18. A smaller diameter hole 28 extends from the center of the counter-sunk hole 26 vertically through the rest of the leg portion. The smaller hole 28 opens through a bottom surface 30 of the leg-handle portion. The bottom surface 30 has a predetermined spherical radius 32.

To attach the leg-handle to the utensil, the utensil is turned upside down with the bosses facing upwardly. The leg-handle is placed over the bosses so that the boss fits into the recess 26. The clearance tolerances are such that the counter-sunk hole 26 will always clear the bosses and the inner surfaces 16 of the legs will clear the bottom wall of the utensil. The dimension A, see FIG. 4, will always be within the tolerance of the distance between the bosses. During assembly, with the utensil upside down, when the leg-handle combination is placed over the bosses its weight will cause the handle portion to contact the adjacent side wall 4 at the stud 34, see FIGS. 1 and 2. A force applied through the stud 34 to the side wall 4 of the utensil will be due only to the inherent torque due to the relationship of the leg-handle combination with respect to the bosses on the bottom wall.

To permanently attach the leg-handle to the utensil, a self-threading screw 36, with a conical spring washer or a belleville washer 38 attached is driven through the hole 28 in the leg portion 10 of the leg-handle combination through the counter-sunk recess 26 and then threaded into the hole 24 in the boss 18. The device used to attach the leg-handle to the boss may be a unit fastener having a belleville washer attached at the head end of the fastener, for example, or the fastener may comprise a screw with a belleville or conical spring washer as a separate part. Of course, other similar fasteners may be used. The large end of the belleville washer 38 fits over the bottom 30 of the leg portion 10, the radius 32 of the bottom 30 and the size of the washer being selected for this to take place. The leg-handle is, therefore, held in three point engagement with the utensil. Two of the three points of engagement are at a pair of bosses with each boss 18 fitting into a recess 26 in the leg-handle. The third point of engagement is stud 34 being held against a side wall of the utensil.

Because of the predetermined radius 22 on the boss and the predetermined radius 32 on the back portion 30 no torque is applied to the one-piece leg-handle 6; thus, no stress is imparted to the leg-handle. In other words, point contact exists between the boss 18 and the leg-handle combination itself. By applying the force of the screw 36 through the belleville washer 38, this force is exerted directly through the point of contact and so no twisting takes place. In the present structure, this is always the case because of the self-aligning feature provided by the radius 32 of the back portion 32 of leg-handle combination. Moreover, this method provides independent ball joint fastening since the two surfaces that fit over the bosses are not parallel. Therefore, no stress or fit problems arise.

FIG. 4 shows the bottom view of the leg-handle combination. Two unit fasteners are required in each leg to attach the leg-handle to the utensil. However, it should be noted that there is no need for the use of fixtures external of the screw with the belleville washers attached, thus permitting greater ease in fabrication of the complete utensil.

Although the present invention has been described in a certain degree of particularity, it should be understood that the present disclosure has been made only by way of example and numerous changes in the details of construction and the combination and arrangement of parts may be resorted to without departing from the scope and spirit of the present invention.

We claim as our invention:

1. In a cooking utensil having bottom and side wall structure, a unitary leg-handle structure having a three-point engagement with said utensil and a pair of upwardly opening recesses, two of said points of engagement comprising a pair of spaced bosses depending from the wall structure of said utensil and mating with said pair of upwardly opening recesses provided in the leg-handle structure, and the third point of engagement comprising a projection on one of said structures contacting the other of said structures.

2. In a cooking utensil having bottom and side wall structure, a unitary leg-handle structure having a three-point engagement with said utensil and a pair of upwardly opening recesses, two of said points of engagement comprising a pair of spaced bosses depending from the bottom wall structure of said utensil near a side thereof and mating with said pair of upwardly opening recesses provided in the leg-handle structure, and the third point of engagement comprising a projection on said leg-handle structure contacting the side wall structure of said utensil.

3. In a cooking utensil having bottom and side wall structure, a unitary leg-handle structure having a three-point engagement with said utensil and a pair of upwardly opening recesses, said leg-handle structure having a leg portion and a handle portion, two of said points of engagement comprising a pair of spaced bosses depending downwardly from the bottom wall structure of said utensil near a side thereof and mating with said pair of upwardly opening recesses provided in the leg portion of said leg-handle structure, and the third point of engagement comprising a projection on the handle portion of said leg-handle structure contacting the side wall structure of said utensil.

4. A cooking utensil having bottom and side walls comprising, a boss having sides extending downwardly from said bottom wall, a leg-handle member having a leg portion disposed adjacent said bottom wall and a handle portion adjacent at least one of said side walls, said leg portion having a recess for receiving said boss, a screw having a head at one end thereof, said screw extending through said leg portion and being threaded into said boss, and a conical washer disposed on said screw between its head and said leg portion.

5. A cooking utensil having bottom and side walls comprising, a boss having sides extending downwardly from said bottom wall and having a bottom surface having a predetermined radius, a leg-handle member having a leg portion disposed adjacent said bottom wall and a handle portion adjacent at least one of said side walls, said leg portion having a counter-sunk recess for receiving said boss, a back portion of said leg portion having a predetermined radius, a screw having a head at one end thereof, said screw extending through the said leg portion and being threaded into said boss, and a conical spring washer disposed on said screw between its head and the back portion of said leg portion.

6. A cooking utensil having bottom and side walls comprising, a boss having sides extending downwardly from said bottom wall and having a bottom surface having a predetermined radius, said boss having a threaded hole extending upwardly thereto, a one piece leg-handle member having a leg portion disposed adjacent said bottom wall and a handle portion adjacent at least one of said side walls and having a counter-sunk recess in said leg portion for receiving said boss, said leg portion having a hole extending from said counter sunk recess to a back portion thereof, said back portion being rounded on a predetermined radius, a self threading screw having a head at one end thereof, said screw extending through the hole in said leg portion and being threaded into the hole in said boss, and a belleville washer disposed on said screw between its head and the back portion of said leg portion.

7. A cooking utensil having bottom and side walls comprising, a boss having sides extending downwardly from said bottom radius, said boss having a counter-sunk hole extending upwardly thereinto, a one piece leg-handle member including a leg portion having an inner surface fitting over a portion of said bottom wall and a handle portion having an inner surface fitting over a portion of at least one of said side walls and having a counter-sunk recess in said leg portion for receiving said boss, said leg portion having a hole extending from said counter-sunk recess to a back portion of said leg portion having a predetermined radius, and a unit fastener including a self-threading screw having a conical spring washer affixed at one end thereof, said screw extending through the counter-sunk hole in said boss, and with the conical spring washer adjacent the back portion of said leg portion.

8. A cooking utensil having bottom and side walls comprising, a plurality of bosses each having sides extending downwardly from said bottom wall and having a bottom surface having a predetermined radius, each of said bosses having a counter-sunk hole extending upwardly thereinto, at least two one piece leg-handle members each having a leg portion disposed adjacent said bottom wall and a handle portion disposed adjacent a different one of said side walls, each of said leg-handle members having at least two counter-sunk recesses in each of said leg portions thereof for receiving at least two of said bosses, each of said leg portions having a hole extending from each of said counter-sunk recesses to a back portion thereof, said back portion being rounded on a predetermined radius, and a plurality of unit fasteners each including a self threading screw having a head end thereof, each of said screws extending through the hole in each of said leg portions and being threaded into the counter-sunk hole in each of said bosses and with the conical spring washer adjacent the back portion of each of said leg portions.

9. A cooking utensil having bottom and side walls comprising, a boss having sides extending downwardly from said bottom wall and having a bottom surface having a predetermined radius, said boss having a counter-sunk hole extending upwardly thereinto, a one piece leg-handle member including a leg portion having an inner surface fitting over a portion of said bottom wall and a laterally extending gripping portion and a handle portion having an inner surface fitting over a portion of at least one of said side walls and a downwardly extending support portion, said leg-handle member having a counter-sunk recess in said leg portion for receiving said boss, said leg portion having a hole extending from said counter-sunk recess to a back portion of said leg portion having a predetermined radius, a self-threading screw having a head at one end thereof, said screw extending through the hole in said leg portion and being threaded into the counter-sunk hole in said boss, and a belleville washer disposed on said screw between its head and the back portion of said leg portion.

10. A cooking utensil having a bottom wall and side walls extending upwardly and outwardly comprising, a plurality of bosses each having sides extending downwardly from said bottom wall and each having a bottom surface having a predetermined radius, said boss having a counter-sunk hole extending upwardly thereinto, a pair of one piece leg-handle members each including a leg portion having an inner surface fitting over a portion of said bottom wall and having a laterally extending gripping portion and a handle portion having an inner surface each fitting over a portion of at least one of opposite ones of said side walls and having a downwardly extending support portion, each of said leg portions having at least two counter-sunk recesses therein for receiving at least two of said bosses, each of said leg portions having a hole extending from each of said counter-sunk recesses to a back portion thereof, said back portion being rounded on a predetermined radius, and a plurality of unit fasteners each including a self-threading screw having a belleville washer affixed at the head end thereof, each of said screws extending through the hole in each of said leg portions and being threaded into the counter-sunk hole in each of said bosses and with the belleville washer being adjacent the back portion of each of said leg portions.

References Cited by the Examiner
UNITED STATES PATENTS 2,816,685 12/57 Schaeffer _____ 220—69
2,886,206  5/59 Kueser _____ 220—94

FRANKLIN T. GARRETT, *Primary Examiner.*